United States Patent
Shen (10) Patent No.: US 9,640,863 B2
(45) Date of Patent: May 2, 2017

(54) DEVICE AND METHOD FOR ANTENNA IMPEDANCE MATCHING

(75) Inventor: Shaowu Shen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 263 days.

(21) Appl. No.: 13/977,231

(22) PCT Filed: Mar. 1, 2011

(86) PCT No.: PCT/CN2011/071437
§ 371 (c)(1),
(2), (4) Date: Jun. 28, 2013

(87) PCT Pub. No.: WO2012/088791
PCT Pub. Date: Jul. 5, 2012

(65) Prior Publication Data
US 2013/0271342 A1    Oct. 17, 2013

(30) Foreign Application Priority Data
Dec. 29, 2010    (CN) .......................... 2010 1 0612024

(51) Int. Cl.
*H01Q 1/50* (2006.01)
*H04B 1/04* (2006.01)
*H04B 1/18* (2006.01)

(52) U.S. Cl.
CPC ............. *H01Q 1/50* (2013.01); *H04B 1/0458* (2013.01); *H04B 1/18* (2013.01)

(58) Field of Classification Search
CPC ........... H01Q 1/50; H01Q 1/0458; H01Q 1/18
(Continued)

(56) References Cited

U.S. PATENT DOCUMENTS

| | | | | | |
|---|---|---|---|---|---|
| 5,862,458 | A | * | 1/1999 | Ishii | ..................... H04B 1/0458 455/107 |
| 7,834,813 | B2 | * | 11/2010 | Caimi | .................... H01Q 9/045 343/745 |
| 8,095,085 | B2 | * | 1/2012 | Song | ......................... H03J 3/06 455/107 |

FOREIGN PATENT DOCUMENTS

| CN | 1411099 A | 4/2003 |
|---|---|---|
| CN | 1770642 A | 5/2006 |

(Continued)

OTHER PUBLICATIONS

Japanese Office Action for the counterpart Japanese Application No. 2013-546564.
(Continued)

*Primary Examiner* — Dameon E Levi
*Assistant Examiner* — Walter Davis
(74) *Attorney, Agent, or Firm* — Ladas & Parry LLP (57) ABSTRACT

The disclosure provides a device and a method for antenna impedance matching. The device comprises an application detection module, configured to detect a current state of an antenna of a terminal, and output a matching adjustment signal according to the state; an adaptive control module, configured to perform control over a process of matching adjustment in response to the matching adjustment signal; and a matching adjustable module, configured to, under control of the adaptive control module, perform matching adjustment on impedance of the antenna through an impedance matching network corresponding to the matching adjustment signal. Through the technical solution provided by the disclosure, the problem of single impedance matching mode in the prior art is solved, and further, the effect that differential matching can be performed for various application states of the terminal is achieved.

11 Claims, 4 Drawing Sheets

(58) Field of Classification Search
USPC .......................................................... 343/861
See application file for complete search history.

(56) References Cited

FOREIGN PATENT DOCUMENTS

| CN | 1957538 A | 5/2007 |
| JP | 8097733 A | 4/1996 |
| JP | 11-136157 A | 5/1999 |
| JP | 2002-353716 A | 12/2002 |
| JP | 2005-354502 A | 12/2005 |

OTHER PUBLICATIONS

Espacenet English abstract of JP 2005-354502 A.
Espacenet English abstract of JP 11-136157 A.
Espacenet English abstract of JP 2002-353716 A.

* cited by examiner

“DEVICE AND METHOD FOR ANTENNA IMPEDANCE MATCHING”

RELATED APPLICATION INFORMATION

This application is a 371 of International Application PCT/CN2011/071437 filed 1 Mar. 2011 entitled "Device and Method for Antenna Impedance Matching", which was published on 5 Jul. 2012, with International Publication Number WO 2012/088791 A1, and which claims priority from CN Application No.: 201010612024.4 filed 29 Dec. 2010, the contents of which are incorporated herein by reference.

TECHNICAL FIELD

The disclosure relates to the field of communication, in particular to a device and a method for antenna impedance matching.

BACKGROUND

The strength of a transmitted signal is directly determined by the performance of an antenna. In adjustment of the antenna, impedance matching and Voltage Standing Wave Ratio (VSWR) have a great influence on the performance of the antenna. Particularly, Total Radiated Power (TRP), Total Isotropic Sensitivity (TIS) and antenna efficiency are extremely important indexes of a mobile phone, which affect the performance of the entire mobile phone and determine the success or failure of a product.

The impedance matching is a working state in which load impedance and internal impedance of an excitation source are interactively adapted to obtain the maximum power output. The impedance matching reflects power transfer relation between an input circuit and an output circuit. When the circuit impedance matches, the maximum power transfer can be obtained. When the impedance mismatches, the power is reflected, the transmitted energy is reduced, and the circuit performance is also damaged.

With diversity of mobile phone systems and popularization of multi-band Code Division Multiple Access (CDMA)/Wideband Code Division Multiple Access (WCDMA)/Global System for Mobile Communications (GSM) mobile phones, the conventional mobile terminals do not only work at a certain independent frequency band. In daily use, people increasingly find that the performance varies more widely along with wider coverage of the frequency band. Since the antenna impedance matching has different values for different frequency bands, when the antenna is in a mismatched state, the call performance is poor, the power consumption of the mobile phone is high, the standby time is short and the body burns after continuous use. The mobile phone design requirement of the GSM has brought greater challengers to antenna matching design of smart phones.

Meanwhile, the structure of the mobile phone also diversifies from bar phones in the beginning to slide phones, side slide phones and 360-degree rotatable displays at present. Such a condition results in that the antenna radiation direction of a mobile phone changes along with change in angle of use. The radiation reference surfaces of the same mobile phone in a back-forth sliding close state and an open state are also different. However, antenna adjustment is generally guaranteed in a certain single state preferably, therefore, it is enormously difficult to choose the antenna matching form and variable.

Furthermore, in design of antenna matching of the mobile phone, generally the radiation performance of a free space is tested, but the influence on the human head and hand is rarely considered, as a result, the harm caused to human bodies cannot be reduced to the minimum under different service environments and conditions. How to adjust the antenna matching of the mobile phone at the right moment according to application conditions and reduce a Specific Absorption Rate (SAR) value on the premise of guaranteeing the receiving performance also becomes an urgent problem to be solved at present.

Meanwhile, with respect to a structural process, although the material and structure of the front and rear shells of the mobile phone, and spray painting and thermal plating processes may change, the form of the antenna is fixed. Therefore, the antenna matching is also required to be adaptively adjusted. With respect to an assembly process, the press fit degree of an antenna elastic sheet differs and the grounding degrees of a mainboard and the antenna differ, therefore, different requirements on the impedance matching are also caused. Finally, with respect to a production process, certain accuracy error also exists in the current antenna Flexible Printed Circuit (FPC) process, frequently fine difference exists in FPC thickness, corners, slits of the same batch of antennas, the slight difference causes difference in antenna radiation performance of one batch of mobile phones, and all these differences can be calibrated and compensated through the antenna impedance matching.

At present, the antenna matching of the mobile phone has the following modes: 1, a single passive L type or π type matching network is adopted; 2, a plurality of matching units are combined and one of the matching units is selected for matching through a path selector or a switch control; 3, antennas with two or more than two working modes are available and each antenna is independently matched; and 4, a variable capacitor is controlled through voltage control or Automatic Gain Control (AGC) to realize matching.

However, all the above-mentioned methods have some disadvantages. For example, in the mode 1, the matching form is fixed and multi-band adjustment is unfavourable. In the form 2, only different matching forms can be selected, the matching forms are complex and redundant and are also relatively independent and fixed for each combination form, and no fine adjustment function is available. In the mode 3, a fixed matching device is provided for each antenna and the mode 3 is only used for a multi-antenna radio frequency system. In the mode 4, the impedance matching is adjusted on the basis of the conventional variable capacitor, the adjustment range is narrow, the adjustment capacity is weak and the matching requirements of a plurality of application occasions at present cannot be met.

SUMMARY

The disclosure mainly provides a device and a method for antenna impedance matching, in order to solve at least one of the problems above.

According to one aspect of the disclosure, a device for antenna impedance matching is provided, comprising: an application detection module, configured to detect a current state of an antenna of a terminal, and output a matching adjustment signal according to the state; an adaptive control module, configured to perform control over a process of matching adjustment in response to the matching adjustment signal; and a matching adjustable module, configured to, under the control of the adaptive control module, perform the matching adjustment on impedance of the antenna through an impedance matching network corresponding to the matching adjustment signal.

The device further comprises: a feedback coupling module, configured to sample a matched impedance value to obtain a circuit measurement value, and output the circuit measurement value to a matching comparison module; and the matching comparison module, configured to perform matching comparison between the circuit measurement value and a target characteristic impedance value, and feed a matching comparison result back to the adaptive control module.

The application detection module comprises: a proximity sensing unit, configured to sense a hand of a person, the head of the person and a free space, and output a sensing result to an application detection unit; a state sensing unit, configured to sense a posture of the terminal and a use orientation of the terminal, and output a sensing result to the application detection unit, wherein the posture comprises opening, closing, slide-up, slide-down, side slide and rotation; a user interaction unit, configured to output a setting result to the application detection unit in response to setting of a working state of the terminal by a user; and the application detection unit, configured to output the matching adjustment signal according to the sensing result output by the proximity sensing unit, the sensing result output by the state sensing unit and the setting result output by the user interaction unit.

The proximity sensing unit is configured to sense the hand of the person, the head of the person and the free space through a proximity sensor by using a proximity sensing principle; and the state sensing unit is configured to sense the posture of the terminal and the use orientation of the terminal through a hall switch and a triaxial acceleration controller.

The adaptive control module is configured to, in response to the matching adjustment signal output by the application detection module, control the matching adjustable module to perform the matching adjustment till full matching is achieved according to a preset digital voltage mapping table and the matching result fed back by the matching comparison module.

A type of the impedance matching network in the matching adjustable module comprises at least one of the followings: π type, T type, L-C type and C-L type.

The impedance matching network comprises: a Micro Electro Mechanical System (MEMS) variable capacitor, and/or a surface micromachining suspended inductor.

The feedback coupling module comprises at least one of the following units: a direct sampling unit, configured to directly sample an impedance value from an output signal of the matching adjustable module and a signal output to a feeding end of the antenna; and an indirect sampling unit, configured to sample an antenna matching section reflected signal power, a voltage standing wave ratio or an emission coefficient which are capable of indirectly reflecting an impedance value.

The matching comparison module comprises at least one of the following units: a direct comparison unit, configured to perform the matching comparison between the impedance value obtained by sampling of the direct sampling unit and the target characteristic impedance value, and feed a matching comparison result back to the adaptive control module; and an indirect comparison unit, configured to perform the matching comparison between the voltage standing wave ratio obtained by sampling of the indirect sampling unit and a preset threshold value, and feed a matching comparison result back to the adaptive control module.

The matching comparison module further comprises: a matching optimization unit, configured to provide a shortest matching adjustment path, which is able to achieve full matching, according to a preset matching curve graph.

According, to another aspect of the disclosure, a method for antenna impedance matching is provided, comprising: detecting, a current state of an antenna of a terminal, and outputting a matching adjustment signal according to the state; and selecting an impedance matching network corresponding to the matching adjustment signal, and adjusting impedance of the antenna through the impedance matching network.

After selecting a rational impedance matching network and adjusting the impedance matching network according to the matching adjustment signal, the method further comprises: sampling a matched impedance value to obtain a circuit measurement value; performing matching comparison between the circuit measurement value and a target characteristic impedance value, and feeding back a matching comparison result; and performing further adjustment on the impedance matching network according to the matching comparison result till full matching is achieved.

Through the disclosure, the solution that the state of the antenna of the terminal is detected in real time and the antenna impedance matching is adjusted by selecting different impedance matching networks according to the detected state is adopted, so that the problem of single impedance matching mode in the prior art is solved, moreover, an effect that differential matching can be performed for various application states of the terminal is achieved.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. It should be noted that the embodiments in the application and features in the embodiments can be mutually combined under the condition of no conflict.

Figure 1:
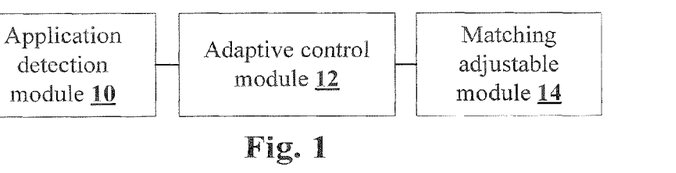
FIG. 1 shows a structure diagram of a device for antenna impedance matching according to an embodiment of the disclosure.

FIG. 1 shows a structure diagram of a device for antenna impedance matching according to an embodiment of the disclosure. As shown in the FIG. 1, the device for antenna impedance matching according to the embodiment of the disclosure comprises:

an application detection module 10, configured to detect a current state of an antenna of a terminal, and output a matching adjustment signal according to the state;

an adaptive control module 12, coupled with the application detection module 10, configured to perform control over a process of matching adjustment in response to the matching adjustment signal; and a matching adjustable module 14, coupled with the adaptive control module 12, configured to, under the control of the adaptive control module 12, perform the matching adjustment on impedance of the antenna through an impedance matching network corresponding to the matching adjustment signal.

According to the device, when the antenna impedance matching is performed, the state of the antenna of the terminal is detected in real time, and then different impedance matching networks are selected to adjust the antenna impedance matching according to the detected state. In this way the difference between different working states is fully considered when the antenna impedance matching is performed, thereby differential matching can be performed for various application states of the terminal. The antenna state mainly refers to factors such as a working frequency band of the antenna, the shape of the terminal and the space environment of the terminal. The factors to be detected can be increased or reduced according to specific requirements.

Figure 2:
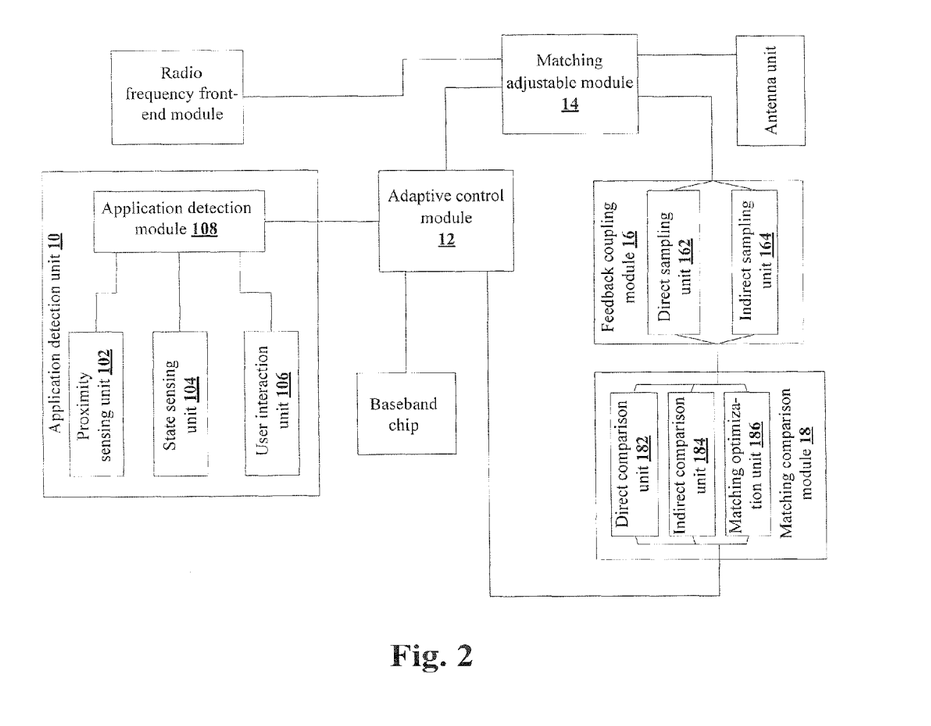
FIG. 2 shows a structure diagram of a device for antenna impedance matching according to a preferred embodiment of the disclosure.

Preferably, as shown in the FIG. 2, the device for antenna impedance matching according to an embodiment of the disclosure may further comprise:

a feedback coupling module 16, configured to sample a matched impedance value to obtain a circuit measurement value, and output the circuit measurement value to a matching comparison module 18; and the matching comparison module 18, configured to perform matching comparison between the circuit measurement value and a target characteristic impedance value, and feed a matching comparison result back to the adaptive control module 12.

Feedback loop control adjustment is realized by the feedback coupling module 16 and the matching comparison module 18, so that the entire device can realize adaptive matching calibration to guarantee more convenient, quicker and more accurate antenna impedance matching. The target characteristic impedance value is a definite value and can be preset.

Preferably, as shown in the FIG. 2, the application detection module 10 may further comprise:

a proximity sensing unit 102, configured to sense a hand of a person, the head of the person and a free space, and output a sensing result to an application detection unit 108;

a state sensing unit 104, configured to sense a posture of the terminal and a use orientation of the terminal, and output a sensing result to the application detection unit 108, wherein the posture comprises opening, closing, slide-up, slide-down, side slide and rotation;

a user interaction unit 106, configured to output a setting result to the application detection unit 108 in response to setting of a working state of the terminal by a user; and the application detection unit 108, configured to generate and output the matching adjustment signal according to the sensing result output by the proximity sensing unit 102, the sensing result output by the state sensing unit 104 and the setting result output by the user interaction unit 106.

Preferably, the proximity sensing unit 102 is configured to sense the hand of the person, the head of the person and the free space through a proximity sensor by using a proximity sensing principle; and the state sensing unit 104 is configured to sense the posture of the terminal and the use orientation of the terminal through a hall switch and a triaxial acceleration controller.

The proximity sensing unit 102 is coupled with the application detection unit 108 and is mainly configured to sense a current environment state in which the mobile phone is used. The proximity sensing unit 102 may monitor whether the mobile phone is close to the head or hand of a person by using the proximity sensor built in the terminal through a proximity sensing principle. If the mobile phone is close to the human head or hand, the proximity sensing unit 102 may output a signal to the application detection module 108 to control a current mobile phone antenna impedance mode. If a free space is sensed, it represents that the antenna radiates in the free space, therefore, no adjustment is required, and the value is kept consistent with a researched and/or developed matching value.

The state sensing unit 104 is coupled with the application detection unit 108 and is mainly configured to sense the current application state of the mobile phone, i.e., the posture of the mobile phone. The function can be realized through a hall switch and a triaxial acceleration controller. For example, the states of opening, closing, slide-up, slide-down and side slide of the mobile phone can be sensed by the hall switch. A reference surface of the antenna of the mobile phone is different in different states of the antenna. Different reference surfaces are sensed by the state sensing unit 104, and then the reference matching values corresponding to the reference surfaces can be adjusted through the adaptive control module 12. The use orientation of the mobile phone can be sensed by the triaxial acceleration controller. For example, if the mobile phone is used in a landscape screen mode, an output enabling signal H1 is of high level; and if the mobile phone is used in a portrait screen mode, the output enabling signal H1 is of low level. In this way, real-time adjustment can be performed according to different electromagnetic wave radiation modes.

The user interaction unit 106 is coupled with the application detection unit 108 and is mainly configured to make an interactive choice by the user for applications such as different frequency band requirements, voice or data transmission requirements and low SAR or high-efficiency power requirements, so that the impedance matching adjustment is completed by the terminal according to different requirements. For example, if the user requires that the terminal is used at a low SAR value, i.e., radiation is limited in the way that the radiation quantity of every gram of human body tissue is extremely low, most of emissive energy is required to radiate far away from the head. How ever, the antenna emits in all directions and the state of the antenna is also fixed, therefore, the antenna radiation direction can only be selectively deviated by changing the antenna matching value, for example, the antenna radiates towards the vertical plane or the parallel plane to avoid the injury to human bodies.

The application detection unit 108 is coupled with the above-mentioned three units and is mainly configured to detect the current state of the antenna of the mobile phone and a user requirement state in real time. The function can be realized through a multi-channel selective switch. The input signal of the multi-channel selective switch is an output enabling signal of each sensor (including but not limited to the above-mentioned three units), and the output signal of the multi-channel selective switch is an adaptive control enabling signal. For example, when the terminal is in a human hand approaching state at present, the application detection unit 108 detects that the input signal is an S1 effective high-level signal; if the human hand leaves, the input signal is an S0 effective low-level signal. If the human head approaches, the input signal is a T1 effective high-level signal; and if the human head leaves, the input signal is a T0 effective low-level signal. Likewise, for the state sensing unit 104, the application detection unit 108 can instantaneously detect, through the output signal of the state sensing unit 104, whether a slide cover of the terminal is opened or closed, whether the slide cover of the terminal is in a slide-up use state or side slide use state, and whether the terminal is in a portrait screen use state or a landscape screen use state. The application detection unit 108 can transmit a control signal to the adaptive control module 12 to make real-time impedance matching adjustment.

Preferably, the adaptive control module 12 may be configured to, in response to a matching adjustment signal output by the application detection module 10, control the matching adjustable module 14 to perform matching adjustment till full matching is achieved according to a preset digital voltage mapping table and the matching comparison result fed back by the matching comparison module 18.

The adaptive control module 12 is coupled with the application detection module 10 and the matching adjustable module 14 and is mainly configured to perform different matching adjustment response control over different states of the mobile phone. An input signal of the adaptive control module is the output signal of the application detection module 10, and the output of the adaptive control module is the input signal of the matching adjustable module 14. The amplitude of the adjustment signal can be obtained by calculation and comparison according to a feedback value fed back by the matching comparison module 18. A group of digital voltage mapping tables are included in the adaptive control module 12. Adjustment of output adaptive voltage signal can be made to the output control voltage value according to the feedback result till the final full matching is finished.

Preferably, the type of the impedance matching network in the matching adjustable module 14 comprises at least one of the following types: π type, T type, L-C type and C-L type.

The matching adjustable module 14 is coupled with the adaptive control module 12 and is mainly configured to perform real-time impedance matching adjustment of the antenna. In the embodiment of the disclosure, the matching adjustable module 14 mainly performs matching adjustment on real-time impedance of the antenna through the impedance matching network, wherein the impedance matching network which can be applied comprises the impedance matching networks of π type, T type, L-C type, C-L type and the like. In specific implementation, a specific model can be rationally controlled and selected according to different requirements, and one or more of the above impedance matching networks can be adopted. It should be noted that the π type matching network actually covers all the L-C matching forms. If a simple matching circuit form of LC or CL can be directly adopted by a circuit calculation result, the control module can control, through a control signal, the π type matching network to only conduct a certain unit or two units, and other units are directly open or short-circuited, so that the matching adjustment process of the entire circuit is reduced greatly.

Preferably, the impedance matching networks comprise: an MEMS variable capacitor, and/or a surface micromachining suspended inductor (i.e., a suspended inductor manufactured by using a surface micromachining process).

Since a conventional variable capacitor has a large size, low Q value and a narrow tunable range, the variation range limit of the capacitance value is less than 150%. Thus, a high-performance MEMS device is preferably adopted in the embodiment of the disclosure. The MEMS device has the advantages of small size, low power consumption, superior performance, mechanical and electrical integration and the like, therefore, the conventional variable capacitance diode can be substituted by the MEMS variable capacitor. The MEMS variable capacitor is not only compatible with the standard Integrated Circuit (IC) process but also has high quality factor and an adjustment range which greatly exceeds that of the conventional variable capacitance diode.

As shown in the FIG. 3, examples of the variable capacitor which can be used in the embodiment of the disclosure are described as follows. One kind of variable capacitor is a parallel plate structure, and the other kind of variable capacitor is an inter-digital structure. For the parallel plate structure, a top plate is suspended for a certain distance from a bottom plate through a suspension MEMS spring, and the adjustment of the distance is controlled by using electrostatic force formed by voltage applied between two polar plates. For the inter-digital structure, the effective area of the capacitor is realized by changing the comb-shaped staggering degree. Since the two polar plates of the capacitor are made into comb-shaped structures, the denser the structure is, the larger the capacitance value and the variation of the capacitor are. For example, when the mobile phone works at the frequency of 800 MHz to 2.1 GHz, the tuning voltage is 0-4 V, and adjustment of 2:1 can be realized, and the Q value can reach up to 34. If the voltage variation range is expanded through a Low Dropout Regulator (LDO), the capacitance tuning range can also be greatly expanded.

Figure 3:
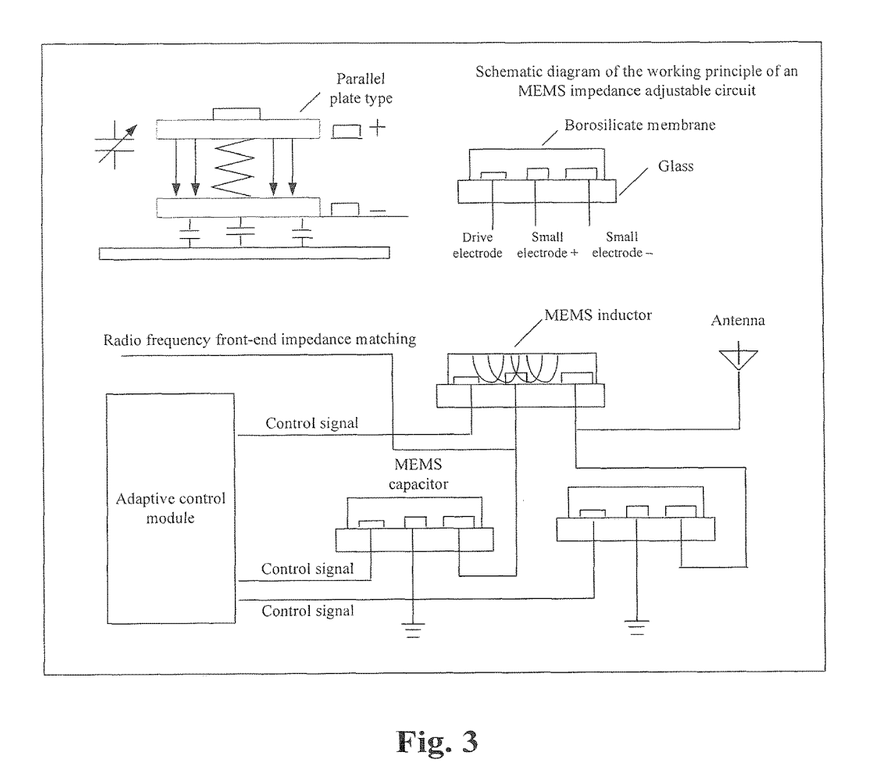
FIG. 3 shows a schematic diagram of the working principle of an MEMS impedance adjustable circuit according to a preferred embodiment of the disclosure.

Another example of the MEMS variable capacitor is also included in the FIG. 3. As shown in the FIG. 3, the variable capacitor consists of a silicon membrane, glass, a small electrode and a driving electrode, wherein the driving electrode and the small electrode are static electrodes and are positioned on a glass substrate; and another electrode is a flexible and movable borosilicate membrane electrode. An electrostatic force is generated between the two electrodes by an electric field established by control voltage, so that the membrane deforms to bend downwards, the deformation changes along with the voltage, and meanwhile, the capacitance between the small electrode and the boron silicon membrane changes along with the deformation of the boron silicon membrane. After the control voltage is removed, the electric field force disappears, and the silicon membrane is restored to be in an initial state under the action of elastic restoring force.

A magnetic core of a coil unit of an adjustable inductor consists of a thin film of a magnetostriction material. The induction coefficient depends on the degree of change in magnetic permeability of the magnetostriction material along with external pressure. The inductance value is controlled by a front-end control signal as well. The variable capacitor of which the inductance varies between 20 pF and 500 pF can be realized by using a suspended inductor manufactured by the surface micromachining process.

Preferably, as shown in the FIG. 2, the feedback coupling module 16 may further comprise:

a direct sampling unit 162, configured to directly sample an impedance value from an output signal of the matching adjustable module 14 or a signal output to a feeding end of the antenna; and an indirect sampling unit 164, configured to sample an antenna matching section reflected signal power, voltage standing wave ratio or an emission coefficient which are capable of indirectly reflecting the impedance value.

The feedback coupling module 16 is coupled with the matching comparison module 18 and the matching adjustable module 14 and is mainly configured to sample and measure a current matched value and couple the matched value to an impedance matching comparison end (an input end) to realize feedback control. A sampled signal can be the following two kinds of signals (corresponding to the above-mentioned two units). The first kind of signal is a direct impedance signal which can be an output end signal of the matching network. The signal can also comprise a system output end signal output from Power Amplifier (PA) to the antenna feeding end, wherein complex impedance Z is measured, then converted into a parameter to be measured according to a corresponding mutual relation, and the parameter is output to the impedance comparison module to perform real part and imaginary part comparison. The second kind of signal is an indirect output signal which may be reflected signal power of the antenna matching end of the mobile phone and may also be the voltage standing wave ratio or the emission coefficient.

Preferably, as shown in the FIG. 2, the matching comparison module 18 may further comprise:

a direct comparison unit 182, configured to perform matching comparison between an impedance value obtained by sampling of the direct sampling unit 162 and the target characteristic impedance value, and feed a matching comparison result back to the adaptive control module 12; and an indirect comparison unit 184, configured to perform matching comparison between the voltage standing wave ratio obtained by sampling of the indirect sampling unit 164 and a preset threshold value, and feed a matching comparison result back to the adaptive control module 12.

The matching comparison module 18 is coupled with the adaptive control module 12 and the feedback coupling module 16. The direct comparison unit 182 is mainly configured to compare the actual impedance measurement value (an impedance value obtained by sampling of the direct sampling unit 162) with the target characteristic impedance value and feed the comparison result back to the adaptive control module to realize feedback loop control adjustment. The measurement value every time is compared with a target matching point, a testing point is set close to a target value as much as possible by performing fine adjustment on the capacitance or the inductance, and then the antenna has good matching with a feeder line in a working frequency band through next fine adjustment of the resonant frequency of the antenna.

An indirect impedance comparison method can be adopted by the indirect comparison unit 184 in the matching comparison module 18, i.e., the voltage standing wave ratio close to the resonant frequency is compared. The voltage standing wave ratio can be used for indirectly describing the degree of mismatch of circuit impedance. The load impedance is changed by any mismatch on a transmission line, so that reflected current and voltage on the transmission line are caused to generate standing wave. Constructive interference and destructive interference occur between incident wave and reflected wave, and the voltage standing wave ratio is a parameter for describing the mismatch and is defined to be a ratio Vmax/Vmin of Vmax to Vmin. For example, a target VSWR is set to be less than 2, if the matching is absolute matching, the target VSWR is set to be 1. If the test value is greater than 1, mismatching occurs, and the larger the test value is, the more severe the mismatching is. The voltage standing wave ratio is sampled through the indirect sampling unit 164 and is transmitted to the matching comparison module 18 for comparison.

Preferably, the matching comparison module 18 may further comprise:

a matching optimization unit 186, configured to provide a shortest matching adjustment path, which can achieve full matching, according to a preset matching curve graph.

The matching optimization unit 186 can further provide a function of selecting an impedance adjustment path. A matching curve diagram is previously stored in the matching optimization unit 186. After the real part and the imaginary part of the test impedance are compared, a group of the shortest impedance optimization paths are compared by the module. The path selection follows the following principle: a series inductor is additionally configured if the path goes along the clockwise direction of a constant resistance circle; a series capacitor is additionally configured if the path goes along the anticlockwise direction of the constant resistance circle; a parallel capacitor is additionally configured if the path goes along the clockwise direction of the constant conductance circle; and a parallel inductor is additionally configured if the path goes along the anticlockwise direction of the constant conductance circle.

In specific implementation, the shortest matching adjustment path is provided in the matching optimization unit 186, all comparison results can be output to the adaptive control module 12 by the matching comparison module 18. The adaptive control module 12 outputs control voltage according to the amplitude of a capacitance value and an inductance value to be adjusted. The matching adjustable module 14 performs further adjustment according to the control voltage. In an entire adjustment process, the adaptive control module 12 performs rough adjustment according to the comparison result at first and then performs fine adjustment on the matching circuit when the values are adjusted to target value threshold ranges, and the micro-electromechanical adjustment is stopped till a matching point is reached.

It should be noted that, in specific implementation, the device for antenna impedance matching may also require that a baseband chip module and a radio frequency front-end module of the terminal coordinate to work. The baseband chip module is coupled with the adaptive control module 12 and is configured to detect Received Signal Strength Indication (RSSI) received by the mobile phone presently. The overall radiation performance of the mobile phone can be inspected by the RSSI. Namely, the impedance matching circuit and the antenna are considered as a whole body, the matching performance between the antenna and the radio frequency front end is considered, the baseband chip judges the quality of a receiving link and whether the broadcast transmission strength is required to be increased, the matching of the mobile phone is self-calibrated through strength of amplitude of the signal, and a calibration result is provided to the adaptive control module for impedance adjustment control.

Figure 4:
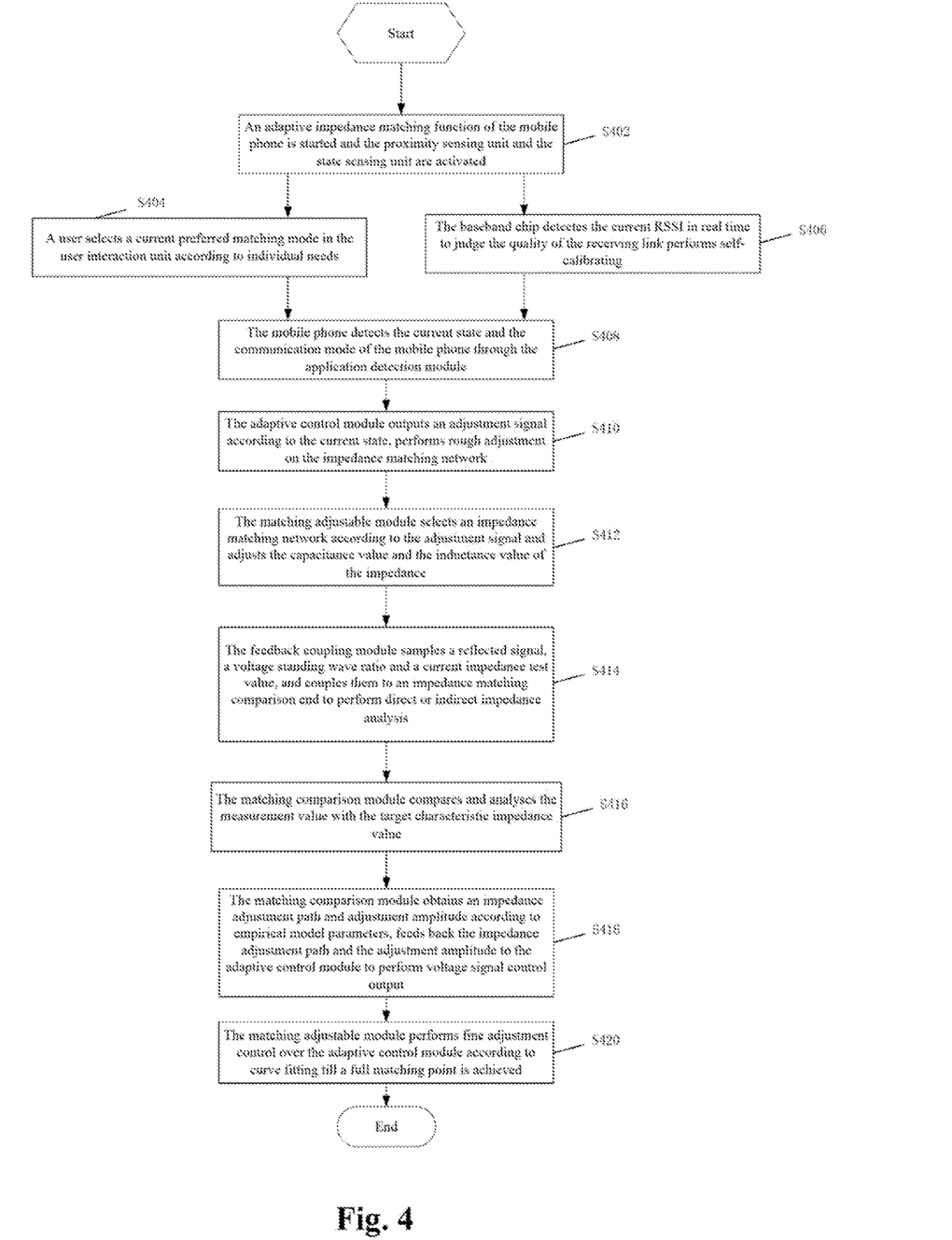
FIG. 4 shows a flowchart for performing antenna impedance matching by applying the device for antenna impedance matching provided by an embodiment of the disclosure according to an embodiment of the disclosure.

FIG. 4 shows a flowchart for performing antenna impedance matching by applying the device for antenna impedance matching provided by an embodiment of the disclosure according to an embodiment of the disclosure. As shown in the FIG. 4, the flow comprises the following steps.

Step S402: an adaptive impedance matching function of the mobile phone is started and the proximity sensing unit 102 and the state sensing unit 104 are activated.

Step S404: a user selects a current preferred matching mode in the user interaction unit 106 according to individual needs, and the matching model performs calibration and comparison subsequently according to the matching mode.

Step S406: the baseband chip detects the current RSSI in real time to judge the quality of the receiving link and whether the broadcast transmission strength is required to be increased, and performs self-calibrating for the matching of the mobile phone through the strength of the amplitude of the signal.

Step S408: the mobile phone detects the current state and the communication mode of the mobile phone through the application detection module 10.

Step S410: the adaptive control module 12 outputs an adjustment signal according to the current state, performs rough adjustment on the impedance matching network, and firstly matches and adjusts the antenna to the working frequency range.

Step S412: the matching adjustable module 14 selects a rational impedance matching network mode according to the adjustment signal and adjusts the capacitance value and the inductance value of the impedance.

Step S414: the feedback coupling module 16 samples a reflected signal, a voltage standing wave ratio and a current impedance test value, and couples them to an impedance matching comparison end to perform direct or indirect impedance analysis.

Step S416: the matching comparison module 18 compares the actual impedance measurement value with the target characteristic impedance value, and feeds back the comparison result to the adaptive control module to realize loop feedback control adjustment, Step S418: if the impedance and the target characteristic impedance mismatch or the voltage standing wave ratio is greater than 2, it represents that the impedance mismatches, the matching comparison module 18 obtains an impedance adjustment path and adjustment amplitude according to empirical model parameters, feeds back the impedance adjustment path and the adjustment amplitude to the adaptive control module to perform voltage signal control output, Step S420: if the matching adjustable module 14 is adjusted to the target matching value range, the matching comparison module 18 performs fine adjustment control over the adaptive control module 12 according to curve fitting, and stops micro-electromechanical adjustment to finish a round of adjustment till a full matching point is achieved.

Figure 5:
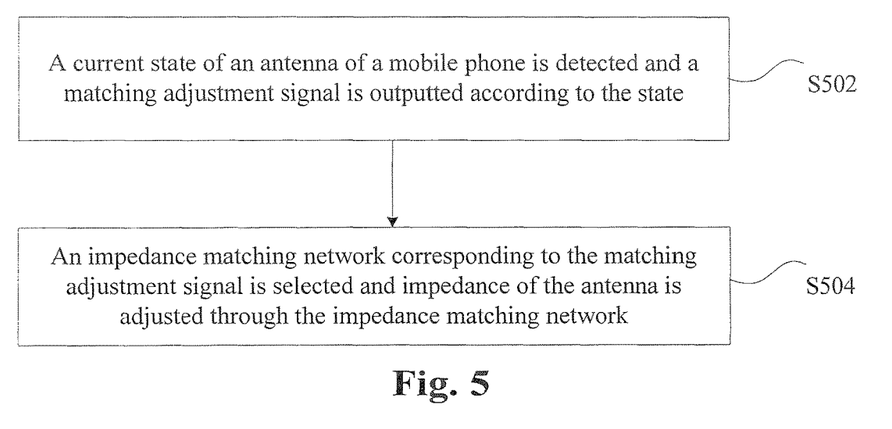
FIG. 5 shows a flowchart of a method for antenna impedance matching according to an embodiment of the disclosure.

FIG. 5 shows a flowchart of a method for antenna impedance matching according to an embodiment of the disclosure. As shown in the FIG. 5, the method for antenna impedance matching according to the embodiment of the disclosure comprises:

Step S502: a current state of an antenna of a mobile phone is detected and a matching adjustment signal is outputted according to the state; and Step S504: an impedance matching network corresponding to the matching adjustment signal is selected and impedance of the antenna is adjusted through the impedance matching network.

Through the method, the state of the antenna of the terminal is detected in real time when the antenna impedance matching is performed, and then different impedance matching networks are selected according to the detected state to adjust the antenna impedance matching, so that the difference between different working states is fully considered when the antenna impedance matching is performed, thereby differential matching can be performed for various application states of the terminal.

Preferably, the method may further comprise the following processing after the Step S504:

(1) a matched impedance value is sampled to obtain a circuit measurement value;

(2) matching comparison is performed between the circuit measurement value and a target characteristic impedance value, and a matching comparison result is fed back; and (3) further adjustment is performed on the impedance matching network according to the matching comparison result till full matching is achieved.

Feedback loop Control adjustment is added, so that adaptive matching calibration can be realized to guarantee more convenient, quicker and more accurate antenna impedance matching.

As can be seen from the description above, the technical solution provided by the embodiments of the disclosure is different from the single fixed impedance matching mode, but various application states of the mobile phone are fully considered to perform differential matching, so that the antenna efficiency and performance of the mobile phone are optimal. Further, not limited to simple combination and switching of various matching modes, dynamic adjustability is realized on the basis of optimal matching circuit design, so that perfect matching of the impedance is realized. In addition, the internal circuit and structure of the mobile phone are fully utilized by the technical solution provided by the embodiments of the disclosure; and by using a microelectromechanical technology and adaptive matching calibration design, the matching mode is scientific, rational, intelligent and practical. Finally, the application state of the mobile phone is fully considered in the technical solution provided by the embodiments of the disclosure, and the antenna matching is adjusted to be in the optimal state at any time to guarantee the safety and reliability in combination with requirements of the user on the performance and electromagnetic radiation.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A device for antenna impedance matching, comprising:
an application detection module, configured to detect a current state of an antenna of a terminal, and output a matching adjustment signal according to the state;
an adaptive control module, configured to perform control over a process of matching adjustment in response to the matching adjustment signal;
a matching adjustable module, configured to, under the control of the adaptive control module, perform the matching adjustment on impedance of the antenna through an impedance matching network corresponding to the matching adjustment signal;

a feedback coupling module, configured to sample a matched impedance value to obtain a circuit measurement value, and output the circuit measurement value to a matching comparison module;

the matching comparison module, configured to perform a matching comparison between the circuit measurement value and a target characteristic impedance value, and feed a matching comparison result back to the adaptive control module;

wherein the application detection module comprises:

a proximity sensing unit, configured to sense a hand of a person, the head of the person and a free space, and output a sensing result to an application detection unit;

a state sensing unit, configured to sense a posture of the terminal and a use orientation of the terminal, and output a sensing result to the application detection unit, wherein the posture comprises opening, closing, slide-up, slide-down, side slide and rotation;

a user interaction unit, configured to output a setting result to the application detection unit in response to setting of a working state of the terminal by a user; and the application detection unit, configured to output the matching adjustment signal according to the sensing result output by the proximity sensing unit, the sensing result output by the state sensing unit and the setting result output by the user interaction unit;

wherein the adaptive control module is further configured to, in response to the matching adjustment signal output by the application detection module, control the matching adjustable module to perform the matching adjustment until full matching is achieved according to a preset digital voltage mapping table and the matching comparison result fed back by the matching comparison module;

wherein the matching comparison module comprises:

a matching optimization unit, configured to provide a shortest matching adjustment path, which is able to achieve full matching, according to a preset matching curve graph.

2. The device according to claim 1, wherein the proximity sensing unit is configured to sense the hand of the person, the head of the person and the free space through a proximity sensor by using a proximity sensing principle; and the state sensing unit is configured to sense the posture of the terminal and the use orientation of the terminal through a hall switch and a triaxial acceleration controller.

3. The device according to claim 1, wherein a type of the impedance matching network in the matching adjustable module comprises at least one of the followings: π type, T type, L-C type and C-L type.

4. The device according to claim 3, wherein the impedance matching network comprises: a Micro Electro Mechanical System (MEMS) variable capacitor, and/or a surface micromachining suspended inductor.

5. The device according to claim 1, wherein the feedback coupling module comprises at least one of the following units:

a direct sampling unit, configured to directly sample an impedance value from an output signal of the matching adjustable module and a signal output to a feeding end of the antenna; and an indirect sampling unit, configured to sample an antenna matching section reflected signal power, a voltage standing wave ratio or an emission coefficient which are capable of indirectly reflecting an impedance value.

6. The device according to claim 5, wherein the matching comparison module comprises at least one of the following units:

a direct comparison unit, configured to perform the matching comparison between the impedance value obtained by sampling of the direct sampling unit and the target characteristic impedance value, and feed a matching comparison result back to the adaptive control module; and an indirect comparison unit, configured to perform the matching comparison between the voltage standing wave ratio obtained by sampling of the indirect sampling unit and a preset threshold value, and feed a matching comparison result back to the adaptive control module.

7. A method for antenna impedance matching, comprising:

detecting a current state of an antenna of a terminal, and outputting a matching adjustment signal according to the state; and selecting an impedance matching network corresponding to the matching adjustment signal, and adjusting impedance of the antenna through the impedance matching network;

wherein detecting a current state of an antenna of a terminal, and outputting a matching adjustment signal according to the state comprises:

sensing a hand of a person, the head of the person and a free space, and outputting a sensing result;

sensing a posture of the terminal and a use orientation of the terminal, and outputting a sensing result, wherein the posture comprises opening, closing, slide-up, slide-down, side slide and rotation;

outputting a setting result in response to setting of a working state of the terminal by a user; and outputting the matching adjustment signal according to all the sensing results;

wherein the method further comprises:

providing a shortest matching adjustment path, which is able to achieve full matching, according to a preset matching curve graph;

wherein after selecting a rational impedance matching network and adjusting the impedance matching network according to the matching adjustment signal, the method further comprises:

sampling a matched impedance value to obtain a circuit measurement value;

performing a matching comparison between the circuit measurement value and a target characteristic impedance value, and feeding back a matching comparison result; and performing further adjustment on the impedance matching network according to the matching comparison result until full matching is achieved.

8. The device according to claim 1, wherein the application detection module comprises:

a proximity sensing unit, configured to sense a hand of a person, the head of the person and a free space, and output a sensing result to an application detection unit;

a state sensing unit, configured to sense a posture of the terminal and a use orientation of the terminal, and output a sensing result to the application detection unit, wherein the posture comprises opening, closing, slide-up, slide-down, side slide and rotation;

a user interaction unit, configured to output a setting result to the application detection unit in response to setting of a working state of the terminal by a user; and the application detection unit, configured to output the matching adjustment signal according to the sensing result output by the proximity sensing unit, the sensing result output by the state sensing unit and the setting result output by the user interaction unit.

9. The device according to claim 8, wherein the proximity sensing unit is configured to sense the hand of the person, the head of the person and the free space through a proximity sensor by using a proximity sensing principle; and the state sensing unit is configured to sense the posture of the terminal and the use orientation of the terminal through a hall switch and a triaxial acceleration controller.

10. The device according to claim 1, wherein a type of the impedance matching network in the matching adjustable module comprises at least one of the followings: $\pi$ type, T type, L-C type and C-L type.

11. The device according to claim 10, wherein the impedance matching network comprises: a Micro Electro Mechanical System (MEMS) variable capacitor, and/or a surface micromachining suspended inductor.

* * * * *